Sept. 8, 1931.                H. J. KERR                1,822,151
                                BAFFLE
                           Filed Oct. 8, 1927
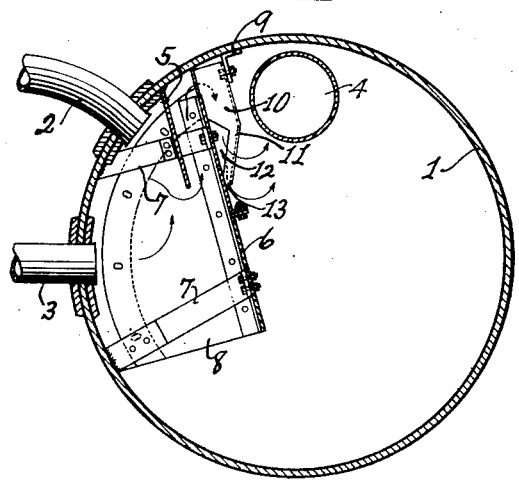
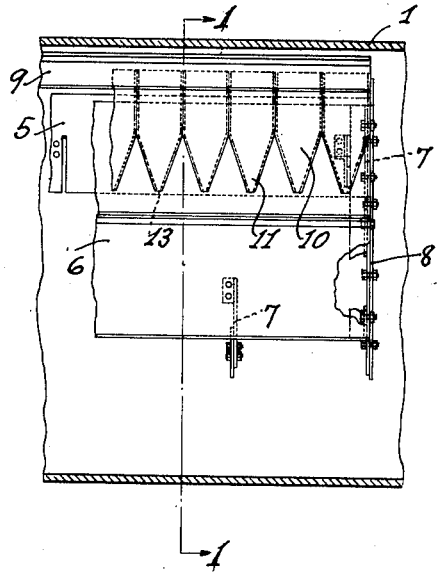
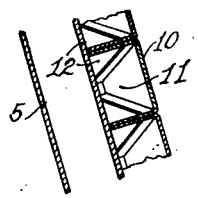
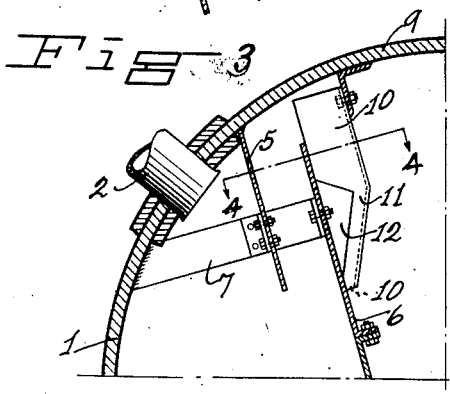
Howard J. Kerr INVENTOR
BY
Gifford & Scull ATTORNEYS Patented Sept. 8, 1931

1,822,151

UNITED STATES PATENT OFFICE

HOWARD J. KERR, OF WESTFIELD, NEW JERSEY, ASSIGNOR TO THE BABCOCK & WILCOX COMPANY, OF BAYONNE, NEW JERSEY, A CORPORATION OF NEW JERSEY

BAFFLE

Application filed October 8, 1927. Serial No. 224,799.

This invention relates to baffles that are especially useful for separating steam and water in the steam and water drum of a water tube boiler, and it will be understood from the description in connection with the accompanying drawings, in which Fig. 1 is a section along the line 1—1 of Fig. 2; Fig. 2 is a longitudinal section partly broken away showing a steam and water drum; Fig. 3 is an enlarged section partly broken away, similar to Fig. 1; and Fig. 4 is a section along the line 4—4 of Fig. 3.

In the drawings, reference character 1 indicates a steam and water drum of a water tube boiler, to the steam space of which a row of tubes 2 is connected, and also to which a row of tubes 3 is connected below the normal water level in the drum. A dry steam pipe 4 of the usual sort is located in the steam space of the drum, and a plate baffle 5 is connected along its upper edge to the inside wall of the drum a short distance from the top and has its lower edge terminating short of the normal water level in the drum. A baffle plate 6 is located a short distance from the plate 5 and is supported upon supports 7. This plate has its upper edge spaced from the inside of the wall of the drum, and its lower edge extends below the normal water level in the drum. End plates 8 close the spaces between the ends of the plate 6 and the wall of the drum to keep steam from escaping around the ends of the plate 6.

An angle iron 9 is connected to the inside of the drum 1 a short distance from the upper edge of the plate 6, and has attached thereto a series of trough-like elements 10 with the side next to the plate 6 open, these troughs 10 being in contact with the plate 6 and their upper edges extending above the upper edge of this plate. The troughs 10 have their lower ends V-shaped as shown at 11, and triangularly shaped openings or slots 12 are provided in the side walls of the V-shaped portions, and openings 13 are provided at the lower ends of the V-shaped portions.

The operation is as follows: The mixture of steam and water entering the tubes 2 strikes the plate 5, and a portion of the water falls into the lower part of the drum while the steam and some of the water passes around the lower edge of the plate 5, thence over the upper edge of the plate 6 as indicated by the arrows, where the mixture enters the troughs 10 and divides into a number of streams. The mixture is separated, the water passing downwardly along the inside of the trough shaped elements 10 and the steam escaping through the V-shaped openings 12. The water finally flows out through the openings 13 at the lower ends of the troughs 10 in a position where it is out of the path of the steam which escapes through the V-shaped openings 12.

Changes and modifications can be made without departing from the spirit or scope of the invention.

I claim:

1. In a steam and water drum, a baffle comprising a plate having its upper edge in contact with the wall of said drum and its lower edge above the normal water level in said drum, a second plate spaced from the first mentioned plate and having its upper edge spaced from the upper wall of said drum and its lower edge below the normal water level, and a series of steam and water separators at the upper edge of said second plate extending from the top of said baffle to the top of said drum.

2. In a steam and water drum, a baffle comprising a plate having its upper edge in contact with the wall of said drum and its lower edge above the normal water level in said drum, a second plate spaced from the first mentioned plate and having its upper edge spaced from the upper wall of said drum and its lower edge below the normal water level, a series of steam and water separators at the upper edge of said second plate extending from the top of said baffle to the top of said drum and means associated with said last named plate to prevent steam and water from passing around the end of said plate.

3. The combination with a drum having steam and water entrances, of baffling means segregating the entrance area from the remainder of the drum and using the normal water level in the drum as a seal for the segregated area, and a labyrinth escape along the upper portion of the baffle including vertical trough-like elements with outlets in the lower portion thereof whereby the escaping wet steam is changed in direction and sub-divided into small streams to enhance the separation of steam and water.

4. The combination with a drum having steam and water entrances, of baffling means segregating the entrance area from the remainder of the drum and using the normal water level in the drum as a seal for the segregated area, and a labyrinth escape along the upper portion of the baffle including vertical trough-like elements with outlets in the sides and bottom portion thereof whereby the escaping wet steam is changed in direction and discharged in a multiplicity of small streams to enhance the separation of the steam and water.

5. The combination with a drum having steam and water entrances, of baffling means segregating the entrance area from the remainder of the drum and using the normal water level in the drum as a seal for the segregated area, and a labyrinth escape along the upper portion of the baffle including vertical trough-like elements open on the side and having their lower ends V-shaped whereby the escaping wet steam is changed in direction and discharged in a multiplicity of small streams to enhance the separation of the steam and water.

6. The combination with a drum having steam and water entrances, of baffling means segregating the entrance area from the remainder of the drum and using the normal water level in the drum as a seal for the segregated area, and a labyrinth escape along the upper portion of the baffle including vertical trough-like elements open on the side and having their lower ends V-shaped and provided with bottom openings and dividing the steam and water into a multiplicity of small streams to enhance the separation of the steam and water.

7. In a steam and water drum, a baffle comprising a plate having its upper edge in contact with the wall of said drum and its lower edge above the normal water level in said drum, a second plate spaced from the first mentioned plate and having its upper edge spaced from the upper wall of said drum and its lower edge below the normal water level, and steam and water separating means at the upper edge of said second plate extending from the top of said baffle to the top of said drum.

HOWARD J. KERR.